Sept. 15, 1931.    J. L. CARD    1,822,955
CLUTCH
Filed May 23, 1929    2 Sheets-Sheet 1
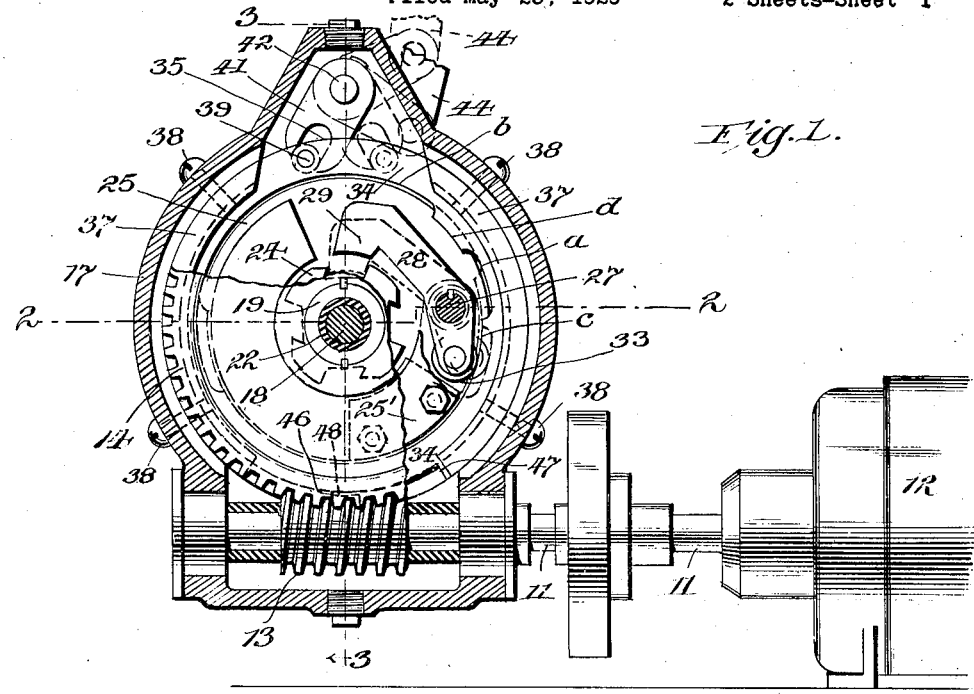
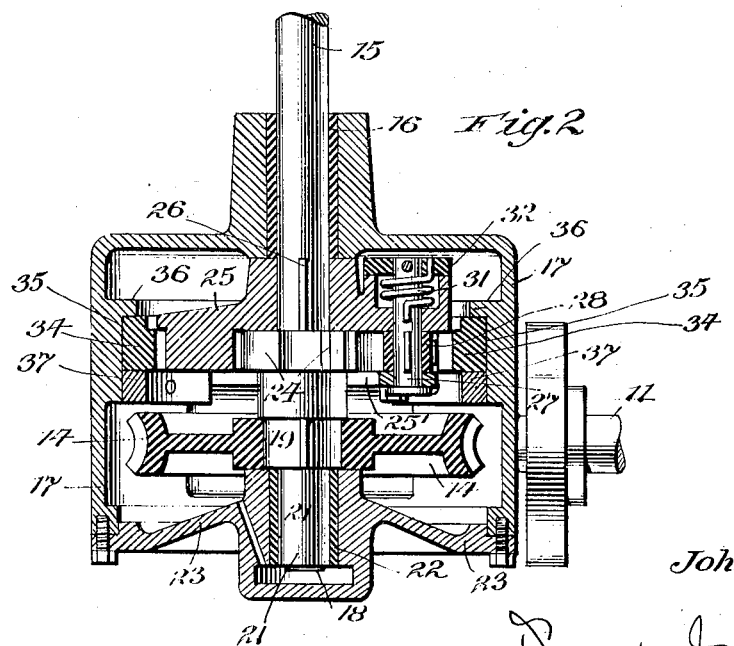
Inventor
John L. Card

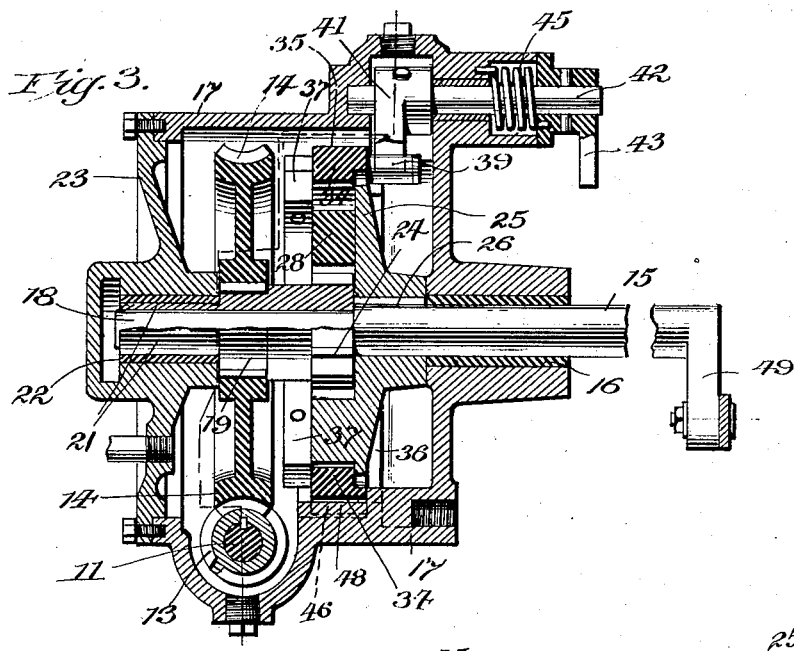

Patented Sept. 15, 1931

1,822,955

UNITED STATES PATENT OFFICE

JOHN L. CARD, OF BALTIMORE, MARYLAND, ASSIGNOR TO UNITED STATES HOFFMAN MACHINERY CORPORATION, OF NEW YORK, N. Y., A CORPORATION OF DELAWARE

CLUTCH

Application filed May 23, 1929. Serial No. 365,404.

This invention relates to clutches and more particularly to a clutch which rotates a driven shaft through a partial revolution and then is automatically disengaged. In certain types of machine, such as presses, it is necessary that power be applied intermittently to a part of the machine from a continuously rotating motor, the period of power application being controlled by the machine operator and not time controlled with respect to the motor. For this purpose, it is desirable to employ a clutch, under control of the operator, for applying the power and which, during the period of power application, is automatically releasable to disengage the driving and driven shafts. When the operator desires to release the power applied part, the clutch is again actuated to rotate the driven shaft and, at the completion of the full revolution, is automatically disengaged to permit the power applied part to remain in its normal position.

The present invention has for one of its objects the provision of an operator controlled clutch capable of bringing a driving member into positive engagement with a driven member but which, after a predetermined period of actuation, is automatically disengageable to uncouple the driving and driven members.

It is a further object of the invention to provide means on the clutch actuating mechanism for returning the driven member to normal position when the operator so desires.

The invention will be more clearly understood from the following description of a preferred form of clutch mechanism and the accompanying drawings, in which:

Figure 1 is a front elevation, partly in section, of the clutch showing its relation to driving and driven shafts;

Fig. 2 is a top sectional view taken on the line 2—2 of Fig. 1;

Fig. 3 is a side sectional view taken on line 3—3 of Fig. 1; and

Fig. 4 is a perspective view of the several parts of the clutch, the parts being shown in disassembled relation for clarity.

Referring to Fig. 1, a driving shaft 11 is continuously rotated by means of a motor 12, it being understood that reduction gearing or other conventional speed change mechanism may be employed, if desired. Secured to one end of shaft 11 is a worm 13 meshing with worm gear 14, the latter forming, in effect, the driving member of the clutch. The driven member is illustrated as a shaft 15 journaled in a bearing 16 in the clutch housing 17, and having a reduced portion at 18 fitting within a sleeve 19. The latter has a reduced portion 21 and is journaled in a bearing 22 in the housing cover 23. The worm gear 14 is keyed to sleeve 19, but shaft 15 is free to rotate with respect to the sleeve, the sleeve and shaft cooperating to support each other, however.

As shown best in Fig. 4, sleeve 19 has an enlarged end and is milled to provide a plurality of ratchet teeth 24 thereon. Fixed to shaft 15 is a plate 25, the hub of which is keyed to shaft 15 at 26. Secured intermediate its ends to a pivot pin 27, and mounted for pivotal movement on the plate 25 is a dog or pawl 28 having an angular projection or tooth 29 at one end thereof and designed to cooperate with the toothed end of sleeve 19 to form a positive coupling between shaft 15 and worm gear 14. A segmental bearing plate 25' also provides a journal for the pivot pin 27 to prevent shearing of the pin during engagement of the clutch members. A spring 31 is fastened at one end to pin 27 and at its other end to a disk 32 cooperating with plate 25 so that the projection 29 of the pawl, unless otherwise constrained, is forced into engagement with the ratchet teeth 24. At the other end of the pawl a roller or cam follower 33 is provided, which roller, as shown in Fig. 1, normally rides on the high portions of an annular cam member 34 to hold the pawl out of engaging relation with the toothed end of sleeve 19.

The annular ring or cam member 34 is provided with two interiorly disposed depressions $a$, $b$, one relatively longer than the other, the remaining interior surfaces $c$, $d$, being concentric with respect to the shaft 15. The peripheral surface 35 of the ring is also concentric with shaft 15 and is finished to slide circumferentially in the clutch housing. Flange 36 and segments 37, the latter removably secured to the housing by means of screws 38, prevent lateral displacement of the cam ring. Attached to the upper portion of the ring is a pin 39 engaged by a forked arm 41, the latter being fastened to a rocker shaft 42 supported in the clutch housing. Also secured to the shaft 42 is a lever 43 adapted to be connected with a link 44 which extends to a manual control (not shown) within reach of the machine operator. Spring 45, secured at one end to the housing and at its other end to lever 43, normally tends to hold the shifting fork 41 in the position shown in Fig. 1.

At the lower portion of the ring its periphery is cut away to provide two stop shoulders 46, 47, adapted to coact with an abutment 48 on the housing to limit the circumferential movement of the cam ring, the purpose of which will be explained hereinafter.

The operation of the clutch is dependent on the positioning of the plate 25 and shaft 15. As shown in Fig. 3, shaft 15 is provided with a crank arm 49 which transmits power to a part which, it is assumed, may be preliminarily moved by hand. This preliminary rotation of shaft 15 brings pawl 28 to the position shown in Fig. 1, the follower 33 remaining on the surface $c$ of the cam during this movement and, therefore, out of engagement with the toothed end of sleeve 19. To throw the pawl into engagement with one of the teeth 24, the cam is shifted by means of the fork 41 to the position indicated by dotted lines at which time the depression $a$ underlies the cam follower. Spring 31 then forces pawl 28 into engagement with the teeth 24. The cam is then released and returns to its normal position. In the meantime, the pawl 28 and shaft 15 have been rotated in a counter-clockwise direction so that cam ring 34 tends to follow the pawl. The stop 46 engaging abutment 48 on the housing limits the movement of the cam, however, and as the roller 34 rides up on the high portion $d$ of the cam, the pawl is disengaged from the teeth 24 and the shaft 15 is stopped in a position corresponding with the dead center of the crank 49.

When it is desired to return the crank to normal position, that is, substantially 180° from its power applying position, the cam ring is again shifted by rocking the fork 41 when the roller 33 will drop into depression $b$ of the cam ring and permit re-engagement of the pawl and toothed end of the sleeve 19. The shaft is then rotated until the roller 33 rides up on to the high portion $c$ of the cam at a point diametrically opposite the high portion $d$, at which time the shaft reaches its normal inactive position.

The above described clutch mechanism has particular advantages in connection with certain types of presses where it is necessary to first position the press member by manual operation and then apply power. It is obvious that the power mechanism cannot be actuated until the preliminary positioning of the press by hand, the cam member being so designed that, although it may be shifted at any time, it will not permit the pawl to engage the power shaft until the driven member has been manually moved or rotated a predetermined distance.

What is claimed is:—

1. A clutch comprising in combination a driving element; a driven element; a pawl on one of said elements; a toothed member on the other of said elements and adapted to engage said pawl; shiftable cam means adapted to hold said pawl in disengaged position during a predetermined movement of said driven element; and means for shifting said cam; said pawl and toothed member engaging each other only after said predetermined movement of the driven element and shifting of the cam.

2. A clutch comprising in combination a driving element; a driven element; a pawl on one of said elements; a toothed member on the other of said elements and adapted to engage said pawl; a shiftable ring; means on said ring for holding said pawl in disengaged position during a predetermined movement of said driven element; means for shifting said ring; said pawl and toothed member engaging each other only after said predetermined movement of the driven element and shifting of the ring; and a second means on said ring for disengaging said pawl and toothed member after a predetermined engagement thereof.

3. A clutch comprising in combination a driving element; a driven element; a pawl on one of said elements; a toothed member on the other of said elements and adapted to engage said pawl; a shiftable ring, said ring having two spaced cam surfaces thereon to hold said pawl out of engagement with said toothed member; means for normally holding said cam surfaces in contact with said pawl; and means for shifting said ring circumferentially to permit said pawl to engage said toothed member when and only when said pawl is in predetermined relation to the normal position of said ring.

4. A clutch comprising in combination a driving element; a driven element; a pawl on one of said elements; a toothed member on the other of said elements and adapted to engage said pawl; a shiftable ring, said ring having two diametrically opposite cam surfaces for holding said pawl out of engagement with said toothed member; and means for shifting said ring to permit engagement of the pawl and toothed member when and only when said pawl is in predetermined relation to the normal position of said ring.

5. A clutch comprising in combination a driving element; a driven element; a toothed member secured to said driving element; a plate fixed to said driven element; a pawl pivotally mounted on said plate and adapted to engage said toothed member; spring means normally forcing said pawl into engagement with said toothed member; cam means for holding said pawl out of engagement with said toothed member; and means for shifting said cam means, said shifting and cam means being inoperative to permit engagement of the pawl and toothed member except when said pawl is positioned in predetermined relation to the normal position of said cam means.

6. A clutch comprising in combination a driving element; a driven element; a toothed member secured coaxially on said driving element; a plate fixed to said driven element; a pawl pivoted intermediate its ends to said plate, said pawl having at one end thereof a projection adapted to engage said toothed member; a cam follower at the other end of said pawl; a shiftable ring; cam means on said ring adapted to coact with said follower to hold said pawl out of engagement with said toothed member; and means for shifting said ring, said shifting and cam means being inoperative to permit engagement of the pawl and toothed means except when said pawl is positioned in predetermined relation to the normal position of said cam means.

In testimony whereof I have signed my name to this specification.

JOHN L. CARD.